US009925832B2

(12) United States Patent
Osugi (10) Patent No.: US 9,925,832 B2
(45) Date of Patent: Mar. 27, 2018

(54) ALERTING DEVICE

(71) Applicant: DENSO CORPORATION, Kariya, Aichi-pref. (JP)

(72) Inventor: Takuya Osugi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/306,618

(22) PCT Filed: Apr. 27, 2015

(86) PCT No.: PCT/JP2015/002263
§ 371 (c)(1),
(2) Date: Oct. 25, 2016

(87) PCT Pub. No.: WO2015/182040
PCT Pub. Date: Dec. 3, 2015

(65) Prior Publication Data
US 2017/0043715 A1    Feb. 16, 2017

(30) Foreign Application Priority Data

May 27, 2014  (JP) .................................. 2014-109384
Jan. 29, 2015  (JP) .................................. 2015-015857

(51) Int. Cl.
*B60Q 9/00*    (2006.01)
*B60C 9/00*    (2006.01)
(Continued)

(52) U.S. Cl.
CPC ................ *B60C 9/00* (2013.01); *G06F 3/013* (2013.01); *G06K 9/00604* (2013.01);
(Continued)

(58) Field of Classification Search
CPC .......................... G06F 3/013; G06K 9/00845; G06K 9/00832; G06K 9/00825; B60Q 9/00; G08G 1/16
See application file for complete search history.

(56) References Cited

U.S. PATENT DOCUMENTS

| 2012/0200490 A1 | 8/2012 | Inada |
| 2012/0215403 A1* | 8/2012 | Tengler ................. B60W 50/12 701/36 |

(Continued)

FOREIGN PATENT DOCUMENTS

| JP | 2006221459 A | 8/2006 |
| JP | 2008085510 A | 4/2008 |

(Continued)

*Primary Examiner* — Hongmin Fan
(74) *Attorney, Agent, or Firm* — Harness, Dickey & Pierce, P.L.C.

(57) ABSTRACT

An alerting device, which alerts a driver of a vehicle when the driver is looking at a display unit of a mobile terminal equipped with a camera, includes a gaze determination portion, an alert command portion, and a circumstance determination portion. The gaze determination portion determines whether the driver is looking at the display unit based on an image captured by the camera of the mobile terminal. When the circumstance determination portion determines that a current circumstance is not a gaze allowed circumstance and the gaze determination portion determines that the driver is looking at the display unit, the alert command portion outputs a command to alert the driver of the looking at the display unit. The circumstance determination portion determines that the current circumstance is the gaze allowed circumstance when the vehicle is halted at an intersection by a red traffic light.

11 Claims, 10 Drawing Sheets

(51) Int. Cl.
*G08G 1/16* (2006.01)
*G06F 3/01* (2006.01)
*G06K 9/00* (2006.01)
*H04M 1/60* (2006.01)
*H04M 1/725* (2006.01)

(52) U.S. Cl.
CPC ........... G06K 9/00845 (2013.01); G08G 1/16 (2013.01); *G06K 9/00825* (2013.01); *H04M 1/6075* (2013.01); *H04M 1/72569* (2013.01); *H04M 2250/52* (2013.01)

(56) References Cited

U.S. PATENT DOCUMENTS

| | | |
|---|---|---|
| 2012/0242819 A1 | 9/2012 | Schamp |
| 2015/0109429 A1 | 4/2015 | Inoue et al. |

FOREIGN PATENT DOCUMENTS

| | | |
|---|---|---|
| JP | 2012053749 A | 3/2012 |
| JP | 2012164012 A | 8/2012 |
| JP | 2014016702 A | 1/2014 |
| JP | 2014515847 A | 7/2014 |

\* cited by examiner

ALERTING DEVICE

CROSS REFERENCE TO RELATED APPLICATIONS

This application is a U.S. National Phase Application under 35 U.S.C. 371 of International Application No. PCT/JP2015/002263 filed on Apr. 27, 2015 and published in Japanese as WO 2015/182040 A1 on Dec. 3, 2015. This application is based on and claims the benefit of priority from Japanese Patent Application No. 2014-109384 filed on May 27, 2014, and Japanese Patent Application No. 2015-015857 filed on Jan. 29, 2015. The entire disclosures of all of the above applications are incorporated herein by reference.

TECHNICAL FIELD

The present disclosure relates to an alerting device which alerts a vehicle driver who looks at a mobile terminal.

BACKGROUND ART

Patent Literature 1 describes a device which alerts a vehicle driver who is inattentively driving a vehicle. More specifically, an image of a driver's face is captured by a camera and an orientation of a head and an orientation of eyes are found by image analysis to determine whether the driver is looking away on the basis of an analysis result.

The inventor conducted a study of using the alerting device described in Patent Literature 1 for inattentive driving caused by looking at a display device attached to an instrument panel in a vehicle interior, and discovered that the alerting device determines that the driver is looking at the display device when an orientation of the face and an orientation of the eyes are within a predetermined range set in advance. The predetermined range may be set empirically by actually finding an orientation of the eyes of the driver or the like.

In recent years, display contents of a mobile terminal, which is carried into the vehicle interior, become rich in variety. Thus, concern is arising about inattentive driving caused by looking at a display unit of the mobile terminal instead of the display device attached to the instrument panel of the vehicle. Moreover, a portion to which the mobile terminal is attached in the vehicle is not particularly specified, the predetermined range cannot be set to a fixed value as disclosed in Patent Literature 1. It is therefore difficult to determine whether the driver is looking at the mobile terminal.

PRIOR ART LITERATURE

Patent Literature

Patent Literature 1: JP 2014-16702 A

SUMMARY OF INVENTION

In view of the foregoing difficulties, it is an object of the present disclosure to provide an alerting device capable of readily alerting a driver who is looking at a mobile terminal.

According to an aspect of the present disclosure, an alerting device, which alerts a driver of a vehicle when the driver is looking at a display unit of a mobile terminal equipped with a camera, includes a gaze determination portion, an alert command portion, and a circumstance determination portion. The gaze determination portion determines whether the driver is looking at the display unit based on image data of an image captured by the camera equipped to the mobile terminal. The alert command portion outputs a command to alert the driver when the gaze determination portion determines that the driver is looking at the display unit of the mobile terminal. The circumstance determination portion determines whether a current circumstance is a gaze allowed circumstance. Herein, the gaze allowed circumstance is a circumstance in which the driver is allowed to look at the display unit of the mobile terminal. The alert command portion outputs the command when the circumstance determination portion determines that the current circumstance is not the gaze allowed circumstance. The circumstance determination portion determines that the current circumstance is the gaze allowed circumstance when the vehicle is halted at an intersection by a traffic light which indicates red.

The alerting device configured as above makes a gaze determination for determining whether the driver is looking at the display unit with use of the camera equipped to the mobile terminal and is therefore capable of making a gaze determination more readily than in a case where a vehicle-mounted camera is used.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

Hereinafter, respective embodiments of an alerting device of the present disclosure will be described with reference to the drawings. In respective embodiments below, a portion corresponding to what has been described in any preceding embodiment is labeled with a same reference symbol and may not be described repetitively. Also, in the respective embodiments below, when only a part of a configuration is described, the configuration described in any preceding embodiment may be applied by reference to the rest of the configuration.

First Embodiment

Figure 1:
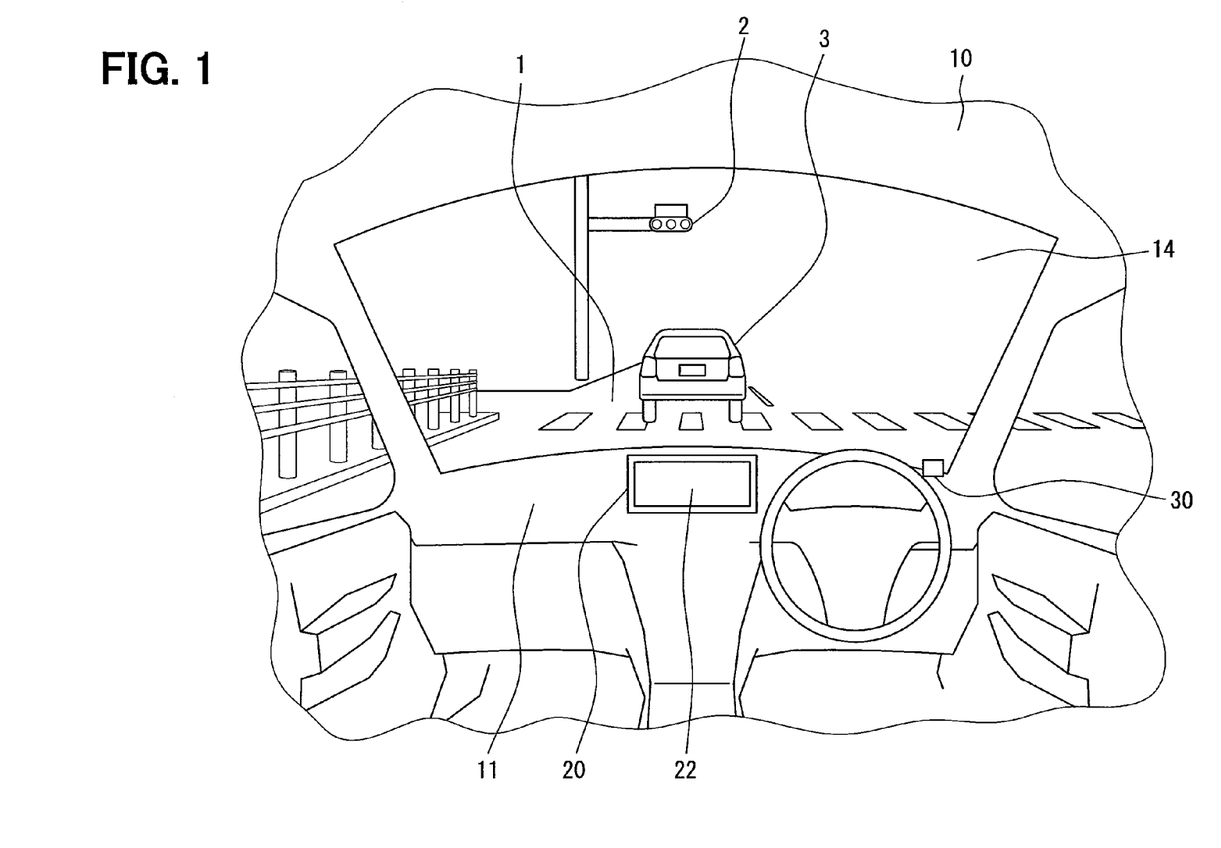
FIG. 1 is a diagram showing a vehicle interior in which an alerting device according to a first embodiment of the present disclosure is attached and also a driver who is an alerting target enters for driving the vehicle.

FIG. 1 is a view showing an interior of a vehicle 10 into which a driver who is to be alerted enters for driving the vehicle. As is shown in the drawing, a vehicle-mounted device 20 is attached to an instrument panel 11 installed in the vehicle interior. The vehicle-mounted device 20 is disposed in a center portion in a right-left direction of the vehicle and is disposed at a location visible by the driver seated on a driver's seat. The vehicle-mounted device 20 is furnished with a function to serve as at least one of a navigation device, an audio device, or an air-conditioning device. A mobile terminal 30 carried into the vehicle interior by the driver is placed on the instrument panel 11.

Figure 2:
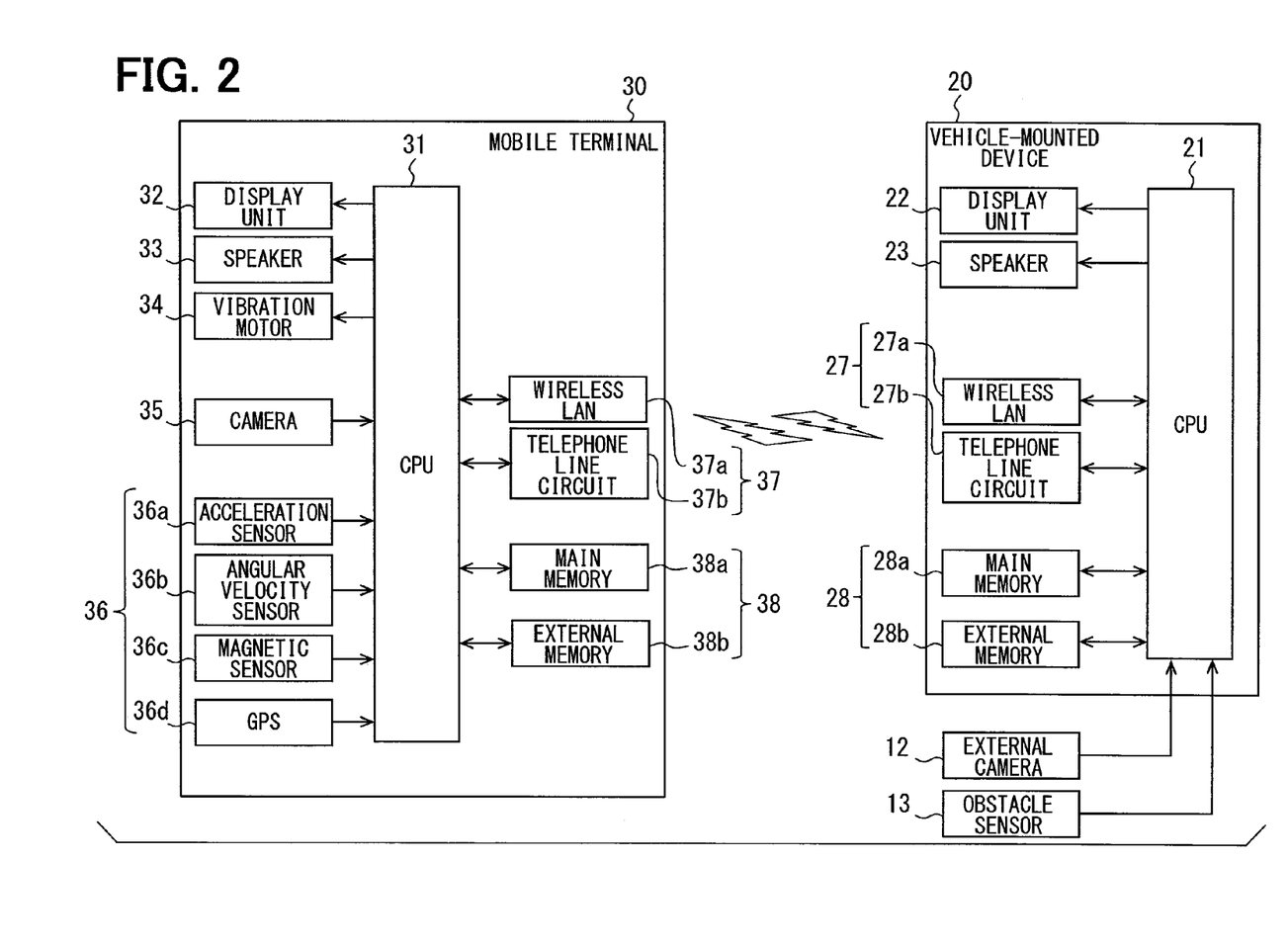
FIG. 2 is a block diagram showing an electrical configuration of the alerting device shown in FIG. 1.

As is shown in FIG. 2, the vehicle-mounted device 20 includes a central processing unit (CPU) 21 performing various types of computation processing to realize the furnished function, and also includes a display unit 22 and a speaker 23 which are controlled by the CPU 21. The vehicle 10 is equipped with an external camera 12 and an obstacle sensor 13. The external camera 12 captures an image of a view outside the vehicle 10. For example, the external camera 12 is capable of capturing images of an intersection 1 positioned ahead of the vehicle 10, a traffic light 2 installed at the intersection 1, and a vehicle 3 positioned ahead of the vehicle 10. The obstacle sensor 13 detects a distance to an obstacle which is present around the vehicle 10 (for example, the vehicle 3 ahead of the vehicle 10) by radar or ultrasound. Data of an image captured by the external camera 12 and a detection value of the obstacle sensor 13 are inputted into the vehicle-mounted device 20.

The vehicle-mounted device 20 includes a wireless circuit 27 including a wireless LAN circuit 27a and a telephone line circuit 27b. The wireless LAN circuit 27a is a circuit that connects to a wireless LAN in accordance with Bluetooth (registered trademark) or Wi-Fi (registered trademark) standards or any other suitable standards. The telephone line circuit 27b is a circuit that connects to a telephone line wirelessly.

The vehicle-mounted device 20 includes a storage device 28 including a main memory 28a and an external memory 28b. A program for computation processing run on the CPU 21 is preliminarily stored in the main memory 28a. The external memory 28b is a memory attachable to and detachable from the vehicle-mounted device 20, such as an SD card. The external memory 28b stores data of an image captured by the external camera 12.

Figure 3:
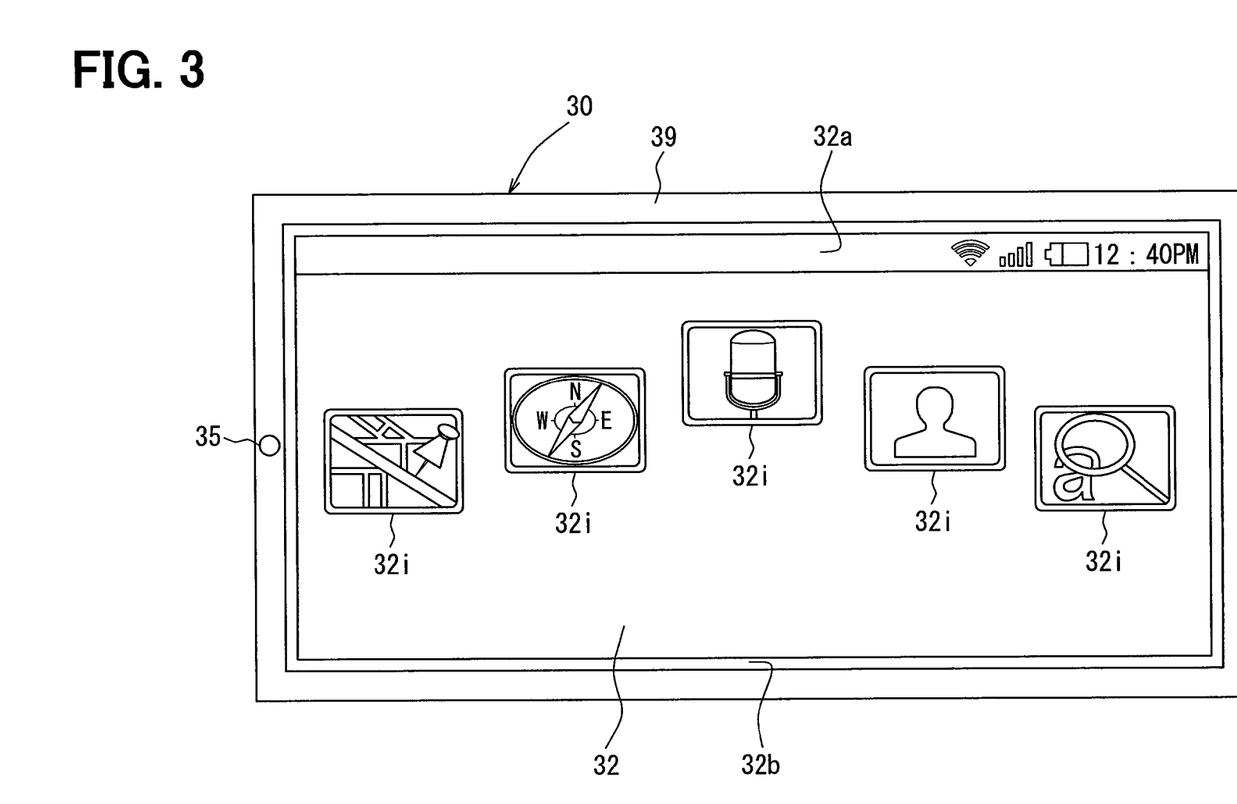
FIG. 3 is a diagram showing a front view of the alerting device shown in FIG. 1.

The mobile terminal 30 includes a central processing unit (CPU) 31, a display unit 32, a speaker 33, a vibration motor 34, a camera 35, a posture sensor 36, a wireless circuit 37, a storage device 38, and a case 39 (see FIG. 3).

As is shown in FIG. 3, the display unit 32 is housed in the case 39. A re-attachable stand (not shown) is attached to the case 39. By the re-attachable stand, the mobile terminal 30 can be attached to the instrument panel 11 with the display unit 32 aligned perpendicularly to a visual line of the driver.

Multiple icons 32i are displayed on the display unit 32. The display unit 32 has a touch sensor which is not shown. When the touch sensor detects a touch operation made by the driver on any icon 32i the driver desires, a command assigned to the touched icon 32i is executed by the CPU 31.

The display unit 32 has a region set as a status display portion 32a to display information on a wireless communication state, a remaining amount of a battery, a present time, and so on. A region located along an outermost periphery of the display unit 32 is set as an alert display portion 32b for displaying an alert to the driver. The speaker 33 and the vibration motor 34 notify various types of information, and also function as an alert portion that alerts the driver.

The camera 35 is capable of capturing an image of a face of an individual who has visual contact with the display unit 32. The posture sensor 36 detects a location and an orientation of the mobile terminal 30. The posture sensor 36 has an acceleration sensor 36a, an angular velocity sensor 36b, a magnetic sensor 36c, and a GPS antenna 36d.

The wireless circuit 37 has a wireless LAN circuit 37a and a telephone line circuit 37b. The wireless LAN circuit 37a is a circuit that connects to a wireless LAN in accordance with Bluetooth or Wi-Fi standards or any other suitable standards. The telephone line circuit 37b is a circuit that connects to a telephone line. Hence, the wireless circuit 37 of the mobile terminal 30 and the wireless circuit 27 of the vehicle-mounted device 20 are allowed to communicate with each other.

Figure 4:
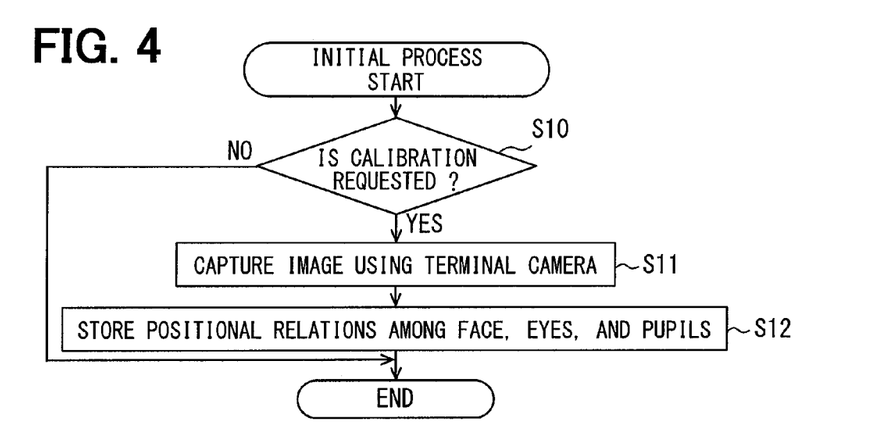
FIG. 4 is a flowchart showing an initial process performed by the alerting device shown in FIG. 1.
Figure 5:
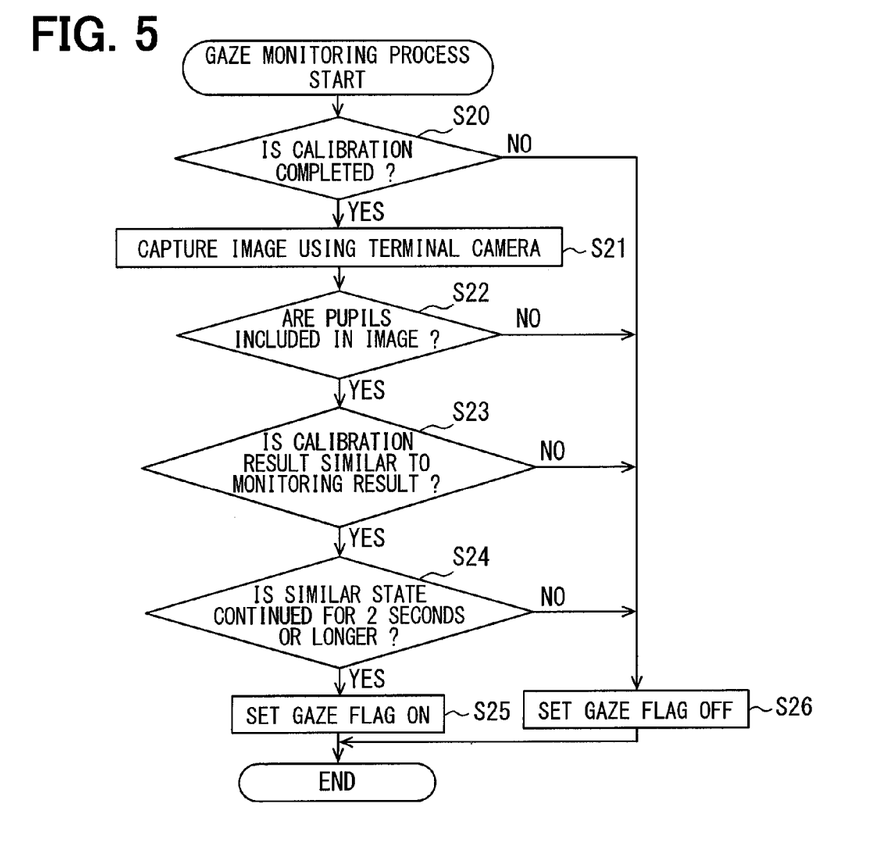
FIG. 5 is a flowchart showing a gaze monitoring process performed by the alerting device shown in FIG. 1.
Figure 6:
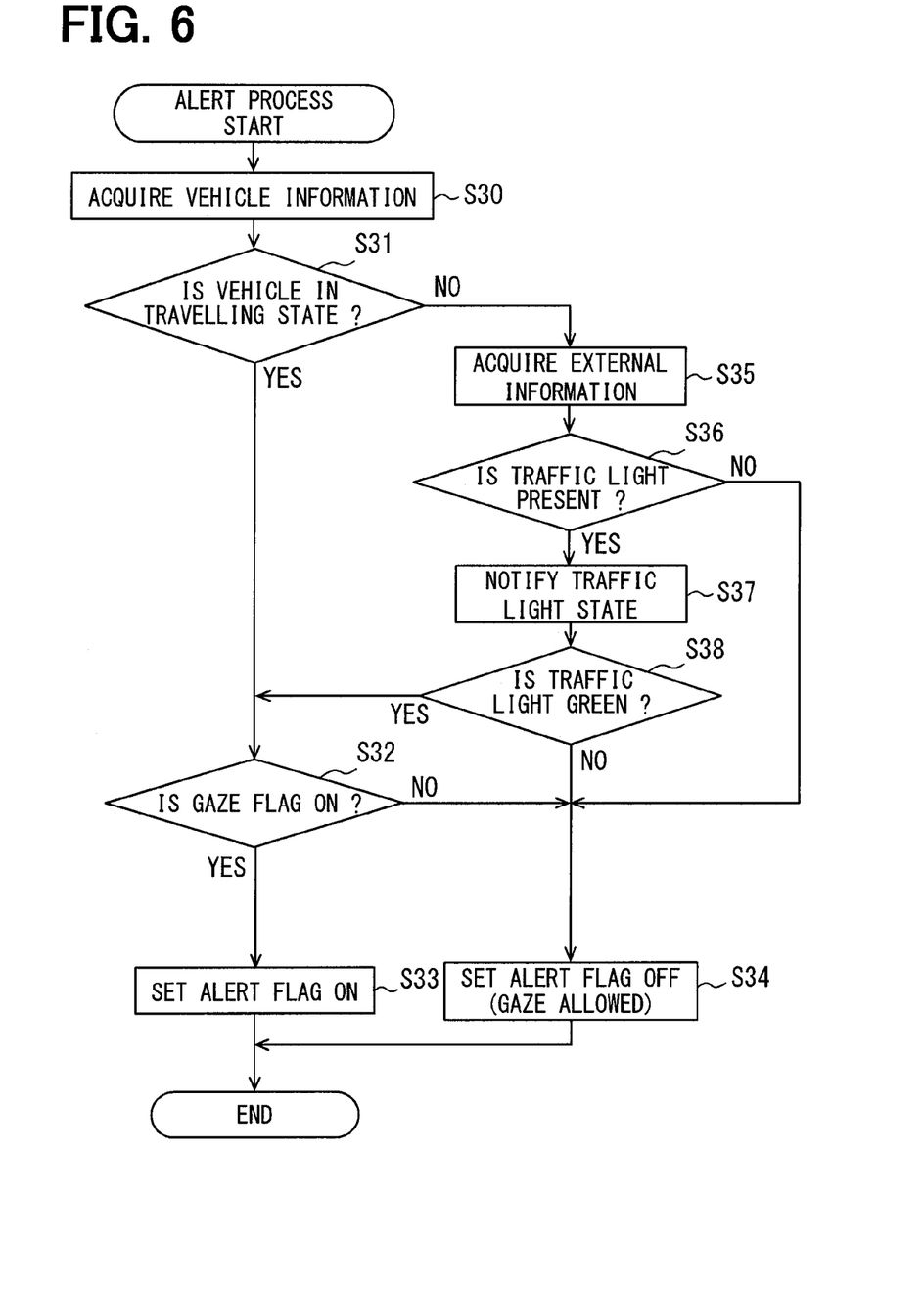
FIG. 6 is a flowchart showing an alert process performed by the alerting device shown in FIG. 1.

The storage device 38 provided to the mobile terminal 30 has a main memory 38a and an external memory 38b. A program for computation process run on the CPU 31, namely, programs for processes shown in FIG. 4, FIG. 5, and FIG. 6 are preliminarily stored in the main memory 38a. The external memory 38b is a memory attachable to and detachable from the mobile terminal 30, such as an SD card. The external memory stores data of an image captured by the camera 35.

Suppose that the vehicle 10 shown in FIG. 1 is in a circumstance where the vehicle 10 is halted at the intersection 1. In such circumstance, the driver is able to visually recognize the traffic light 2 installed at the intersection 1 and the vehicle 3 ahead of the vehicle 10 through a front windshield 14. More specifically, the vehicle 10 has halted at the intersection 1 stopped by the red traffic light 2, and then, the vehicle 3 ahead of the vehicle 10 starts moving with a turning of the traffic light from red to green. However, the vehicle 10 is still halted because the driver is looking at the mobile terminal 30 during the red light and failed to notice that the traffic light turned from red to green.

That is to say, in the circumstance shown in FIG. 1, the driver is not allowed to look at the display unit 32 of the mobile terminal 30, and instead, is required to look at the traffic light 2 to start the vehicle 10 as soon as the traffic light turns from red to green. In short, a visual line of the driver is actually directed to the mobile terminal 30 when the visual line should be directed to the traffic light 2. The mobile terminal 30 functions as an alerting device in this kind of circumstance where the driver is not allowed to look at the mobile terminal 30. Herein, the alerting device alerts the driver who is looking at the mobile terminal 30.

Processes performed by the CPU 31 of the mobile terminal 30 to function as the alerting device will now be described with reference to FIG. 4, FIG. 5, and FIG. 6. FIG. 5 shows a process to determine whether the driver is looking at the mobile terminal 30. FIG. 4 shows an initial process by which calibration is performed to obtain a determination reference used for a determination of FIG. 5. FIG. 6 shows a process to output a command to alert the driver on condition that it is the circumstance where the driver is not allowed to look at the mobile terminal 30 when the driver is determined to looking at the mobile terminal 30 by the process of FIG. 5.

A procedure of the initial process shown in FIG. 4 will now be described. Firstly in step S10, the CPU 31 determines whether an execution of the calibration is requested. More specifically, whether the calibration is requested is determined on the basis of whether one of the multiple icons 32i, which is displayed on the display unit 32 and is assigned with a command to execute the calibration, is selected and activated by a user.

When the CPU 31 determines in step S10 that the calibration is requested, an audio announcement asking the driver to look at the display unit 32 of the mobile terminal 30 is outputted from the speaker 33 in subsequent step S11. Further, an image is captured by actuating the camera 35 of the mobile terminal 30 also in step S11. Consequently, an image of a face of the driver who is looking at the display unit 32 instructed by the announcement is captured by the camera 35.

In subsequent step S12, image analysis is applied to the face, eyes, and pupils of the driver on the basis of image data acquired in step S11. For example, shapes and orientations of the face, the eyes, and the pupils and positional relations among the foregoing face elements are found by image analysis. A result of the image analysis is stored in the storage device 38 as reference information.

The process performed in steps S11 and S12 by the CPU 31 corresponds to "a calibration portion", and the calibration portion acquires image data when the driver is looking at the display unit 32.

A procedure of a gaze monitoring process shown in FIG. 5 will now be described. The gaze monitoring process is performed by the CPU 31 repetitively at predetermined cycles when one of the multiple icons 32i which is assigned with a command to execute gaze monitoring is selected and activated. Firstly in step S20, the CPU 31 determines whether the calibration in the initial process of FIG. 4 is completed. When the location or the orientation of the mobile terminal 30 in the vehicle interior is changed after the storing of the reference information in step S12, the CPU 31 determines that the calibration is not completed. A change in location or orientation is determined based on a detection result outputted from the posture sensor 36.

When the CPU 31 determines in step S20 that the calibration is completed, an image is captured by actuating the camera 35 of the mobile terminal 30 in subsequent step S21. An image is captured repetitively every predetermined time until a remaining amount of the battery of the mobile terminal 30 decreases below a predetermined level. A moving image may be captured by setting the predetermined time extremely short.

In subsequent step S22, the CPU 31 determines whether the pupils of the driver are included in the image (monitoring image) captured in step S21. For example, in a case where the driver is looking behind the vehicle 10 by twisting an upper body, a direction of an actual visual line of the driver may deviate considerably from a direction of a visual line to the mobile terminal 30. In such a case, even when the face is in the monitoring image, the pupils are not included in the monitoring image. Hence, a negative determination is made in step S22.

When the CPU 31 determines in step S22 that the pupils are included in the monitoring image, the reference information in the storage device 38 is compared with monitoring information in subsequent step S23. The monitoring information includes parameters indicating the shapes and the orientations of the face, the eyes, and the pupils in the monitoring image and the positional relations among the foregoing facial elements. When a difference between various parameters included in the monitoring information and various parameters included in the reference information is less than a predetermined amount, the CPU 31 determines that the monitoring information is similar to the reference information. In short, the CPU 31 determines that the monitoring result is similar to the calibration result.

When the CPU 31 determines positively in step S23 that the two results are similar to each other as above, the CPU 31 further determines whether a state of the positive determination has continued for a predetermined time of period (for example, two seconds) or longer in subsequent step S24. The predetermined time of period used for the determination in step S24 is set longer than the image capturing interval at which the images are captured in step S21.

When the CPU 31 determines positively in step S24 that the similar state has continued for two seconds or longer, a gaze flag is set to ON in subsequent step S25 because it is estimated that the driver is looking at the display unit 32 of the mobile terminal 30. On the other hand, when a negative determination is made in any one of steps S24, S23, and S22, the gaze flag is set to OFF in step S26 because it is estimated that the driver is not looking at the display unit 32. When a negative determination is made in step S20, the gaze flag is set to OFF in step S26 because a gaze determination cannot be carried out.

The process performed by the CPU 31 in step S23 corresponds to "a gaze determination portion", and the gaze determination portion determines whether the driver is looking at the display unit 32 on the basis of data of an image captured by the camera 35.

A procedure of the alert process shown in FIG. 6 will now be described. The alert process is performed by the CPU 31 repetitively at predetermined intervals when the icon assigned with the command to execute the gaze monitoring described above is selected and activated. Firstly in step S30, the CPU 31 acquires vehicle information stored in the storage device 28 of the vehicle-mounted device 20 through a communication with the vehicle-mounted device 20. The vehicle information includes information indicating a travelling state of the vehicle 10, information indicating whether the vehicle is travelling forward, a travelling speed, a steering angle of the steering wheel, an operating state of an internal combustion engine, and so on.

In subsequent step S31, the CPU 31 determines whether the vehicle 10 is travelling on the basis of the vehicle information acquired in step S30. When the CPU 31 determines that the vehicle 10 is travelling, the CPU 31 further determines whether the above-described gaze flag shown in FIG. 5 is set to ON in subsequent step S32. When determining that the gaze flag is set to ON, the CPU 31 sets an alert flag to ON in subsequent step S33. When the alert flag is set to ON, a command to alert the driver is outputted. In other words, while the vehicle 10 is travelling (S31: YES), it is estimated that the vehicle is in the circumstance where the driver is not allowed to look at the display unit 32 of the mobile terminal 30. When the alert flag is set to ON (S32: YES) in such circumstance, the CPU 31 outputs a command to alert the driver.

The CPU 31 outputs a signal corresponding to the alert command to the display unit 32, the speaker 33, and the vibration motor 34 of the mobile terminal 30. Upon receipt of the alert command, the display unit 32 displays the alert display portion 32b in a manner such that the display portion can attract an attention of the driver. For example, the alert display portion 32b may be flashed in red. Upon receipt of the alert command, the speaker 33 outputs an audio signal to ask the driver to stop looking at the mobile terminal 30. For example, an audio announcing to stop looking at the mobile terminal 30 or an alarm may be outputted. Upon receipt of the alert command, the vibration motor 34 may start vibration and alert the driver with use of the vibration.

On the other hand, when determining in step S32 that the gaze flag is set to OFF, the CPU 31 sets the alert flag to OFF in subsequent step S34 since it is estimated that the driver is in a gaze allowed circumstance where the driver is allowed to look at the mobile terminal 30.

The following will describe a following process when the CPU 31 determines in step S31 that the vehicle 10 is not in travelling state. In step S35, the CPU 31 acquires external information stored in the storage device 28 of the vehicle-mounted device 20 through a communication with the vehicle-mounted device 20. The external information includes data of an image captured by the external camera 12, a detection result of the obstacle sensor 13, traffic jam information and light information acquired by the wireless circuit 27 through a communication with an outside transmitter, and so on.

In subsequent step S36, whether the traffic light 2 is present ahead of the currently halted vehicle 10 is determined on the basis of the external information acquired in step S35. For example, an image captured by the external camera 12 is analyzed to determine whether the traffic light 2 is included in the image. Alternatively, whether the traffic light 2 is present is determined on the basis of the traffic light state information acquired by the wireless circuit 27.

When the CPU 31 determines positively in step S36 that the traffic light 2 is present, a command (light notification command) to notify the driver of a state of the traffic light 2 is outputted in step S37. Specific examples of a state of the traffic light 2 include a color of a current light on the traffic light 2, a time taken until the current light turns to another color, a distance from the vehicle 10 to the traffic light 2, and so on. Information indicating a state of the traffic light 2 is included in the external information acquired in step S35.

The CPU 31 outputs a signal including the traffic light notification command to the display unit 32, the speaker 33, and the vibration motor 34 of the mobile terminal 30. Upon receipt of the traffic light notification command, the display unit 32 changes a display color of the alert display portion 32*b* at a time point when the color of the traffic light is changed. For example, a color same as the current color of the traffic light may be displayed by the alert display portion 32*b*. Upon receipt of the traffic light notification command, the speaker 33 outputs an audio signal that notifies of the color change of the traffic light at a time point when the color of the traffic light is changed. For example, an audio announcement informing the color change of the traffic light or an alarm may be outputted. Upon receipt of the traffic light notification command, the vibration motor 34 notifies the driver that the color of the traffic light has changed by starting vibration at a time point when the color of the traffic light is changed.

In subsequent step S38, the CPU 31 determines whether a current color of the traffic light is green. When the CPU 31 determines that the traffic light is green, the process proceeds to step S32 because the CPU 31 determines that the gaze on the mobile terminal is not allowed in the current circumstance even when it is determined in step S31 that the vehicle 10 is halted. On the other hand, when the CPU 31 determines in step S38 that the traffic light is not green, the process proceeds to step S34 because the current circumstance is determined to be the gaze allowed circumstance. When the CPU 31 determines that no traffic light 2 is present in step S36, the process proceeds to step S34 because the current circumstance is determined to be the gaze allowed circumstance.

The process performed by the CPU 31 in step S33 corresponds to "an alert command portion", and the alert command portion outputs a command to alert the driver when the driver is determined to be looking at the display unit 32 by the gaze determination portion. The process performed by the CPU 31 in steps S31, S32, S36, and S38 corresponds to "a circumstance determination portion", and the circumstance determination portion determines whether the current circumstance is the gaze allowed circumstance. Herein, the gaze allowed circumstance is a circumstance where the driver is allowed to look at the display unit 32. The process performed by the CPU 31 in step S37 corresponds to "a notification command portion", and the notification command portion outputs a command to notify the driver of a state of the traffic light 2 when the vehicle 10 is halted at the intersection 1 where the traffic light 2 is installed.

According to the present embodiment, when the driver is determined to be looking at the mobile terminal 30 by a gaze determination, a command for alerting the driver is outputted, and most importantly, the gaze determination is made on the basis of data of an image captured by the camera 35 equipped to the mobile terminal 30. With this configuration, a positional relation between the mobile terminal 30 as a gazed subject and the camera 35 can be specified. In a case contrary to the present invention where a gaze determination is made using a vehicle-mounted camera installed at a fixed location in the vehicle interior, a positional relation between the mobile terminal 30 and the vehicle-mounted camera is not particularly specified, and the variable positional relation makes a gaze determination difficult. Hence, a gaze determination can be readily made by the present embodiment in which a gaze determination is made using the camera 35 equipped to the mobile terminal 30.

In some cases, the driver is allowed to look at the mobile terminal 30 under a circumstance, for example, when the vehicle 10 is halted at the red traffic light. In this kind of gaze allowed circumstance, the driver may feel annoyed when looking at the mobile terminal is alerted by the alerting device. The present embodiment takes such an inconvenience into consideration and is therefore configured to include the circumstance determination portion which determines whether the current circumstance is the gaze allowed circumstance. Herein, the gaze allowed circumstance is a circumstance where the driver is allowed to look at the display unit 32 of the mobile terminal 30. The alert command portion outputs a command to alert the driver under a condition that the circumstance determination portion determines that the current circumstance is not the gaze allowed circumstance. Hence, alerting the driver even when the driver is looking at the mobile terminal 30 in the gaze allowed circumstance can be restricted. Accordingly, making the driver feel annoyed by alerting the driver more than necessary can be avoided.

According to the present embodiment, the circumstance determination portion determines that the current circumstance is not the gaze allowed circumstance while the vehicle 10 is travelling. Whether the vehicle 10 is travelling can be readily determined on the basis of the vehicle information. Thus, whether the current circumstance is the gaze allowed circumstance can be readily determined.

According to the present embodiment, the circumstance determination portion determines that the current circumstance is the gaze allowed circumstance when the vehicle 10 is halted and the traffic light 2 located at the intersection 1 is red. When the vehicle 10 is halted at a red traffic light, it is not necessary to alert the driver. Thus, unnecessary alerting can be avoided.

According to the present embodiment, the circumstance determination portion determines that the current circumstance is not the gaze allowed circumstance even when the vehicle 10 is halted under the green traffic light 2. Hence, the driver who is looking at the mobile terminal 30 and therefore failing to notice the change of traffic light to green can be alerted properly.

According to the present embodiment, the alerting device includes the notification command portion which outputs a command to notify the driver of a state of the traffic light 2 when the vehicle 10 is halted at the intersection 1 where the traffic light 2 is installed. Hence, the driver who is looking at the mobile terminal 30 at a green traffic light can be notified of the information that the traffic light is shortly going to turn to yellow or how long it takes before the traffic light turns to red. Accordingly, the driver can be notified in advance that the traffic light 2 is going to turn from green to yellow or red. In short, the driver can be notified in advance that a change is going take place from the gaze allowed circumstance to a circumstance other than the gaze allowed circumstance. Consequently, a precaution can be taken for the driver not to keep looking at the mobile terminal 30 even after the gaze allowed circumstance changed to the circumstance other than the gaze allowed circumstance.

When such an advance notification is displayed on the display unit 22 of the vehicle-mounted device 20, concern arises about a possibility that the driver who is looking at the display unit 32 of the mobile terminal 30 fails to notice the displayed advance notification. The present embodiment addresses the concern and is therefore configured in such a manner that the display unit 32 of the mobile terminal 30 displays an image in a color corresponding to a color on the traffic light 2 according to a command outputted from the notification command portion. In short, the advance notification is displayed by the display unit 32 of the mobile terminal 30. Hence, the concern can be eased and it becomes easier for the driver to know a color on the traffic light 2 while looking at the mobile terminal 30.

According to the present embodiment, whether the driver is looking at the mobile terminal 30 is determined (gaze determination) on the basis of data of an image captured by the camera equipped to the mobile terminal 30. Hence, a positional relation between the mobile terminal as a gazed subject and the camera can be specified. On the other hand, in a case where a gaze determination is made using a vehicle-mounted camera provided at a fixed location in the vehicle interior, a positional relation between the mobile terminal 30 and the vehicle-mounted camera cannot be particularly specified. Hence, the positional relation needs to be detected in the first place and a gaze determination program capable of addressing all positional relations is required, and this configuration makes a gaze determination difficult. In contrast, according to the present disclosure in which a gaze determination is made using the camera equipped to the mobile terminal 30, a gaze determination can be made more readily than in a case where the vehicle-mounted camera is used.

According to the present embodiment, the alerting device includes the calibration portion which acquires image data when the driver is looking at the mobile terminal 30. The gaze determination portion determines whether the driver is looking at the mobile terminal 30 in reference to the image data acquired by the calibration portion. Because a gaze determination is made in reference to the image data when the driver is actually looking at the mobile terminal 30, accuracy of the gaze determination can be enhanced.

Second Embodiment

Figure 7:
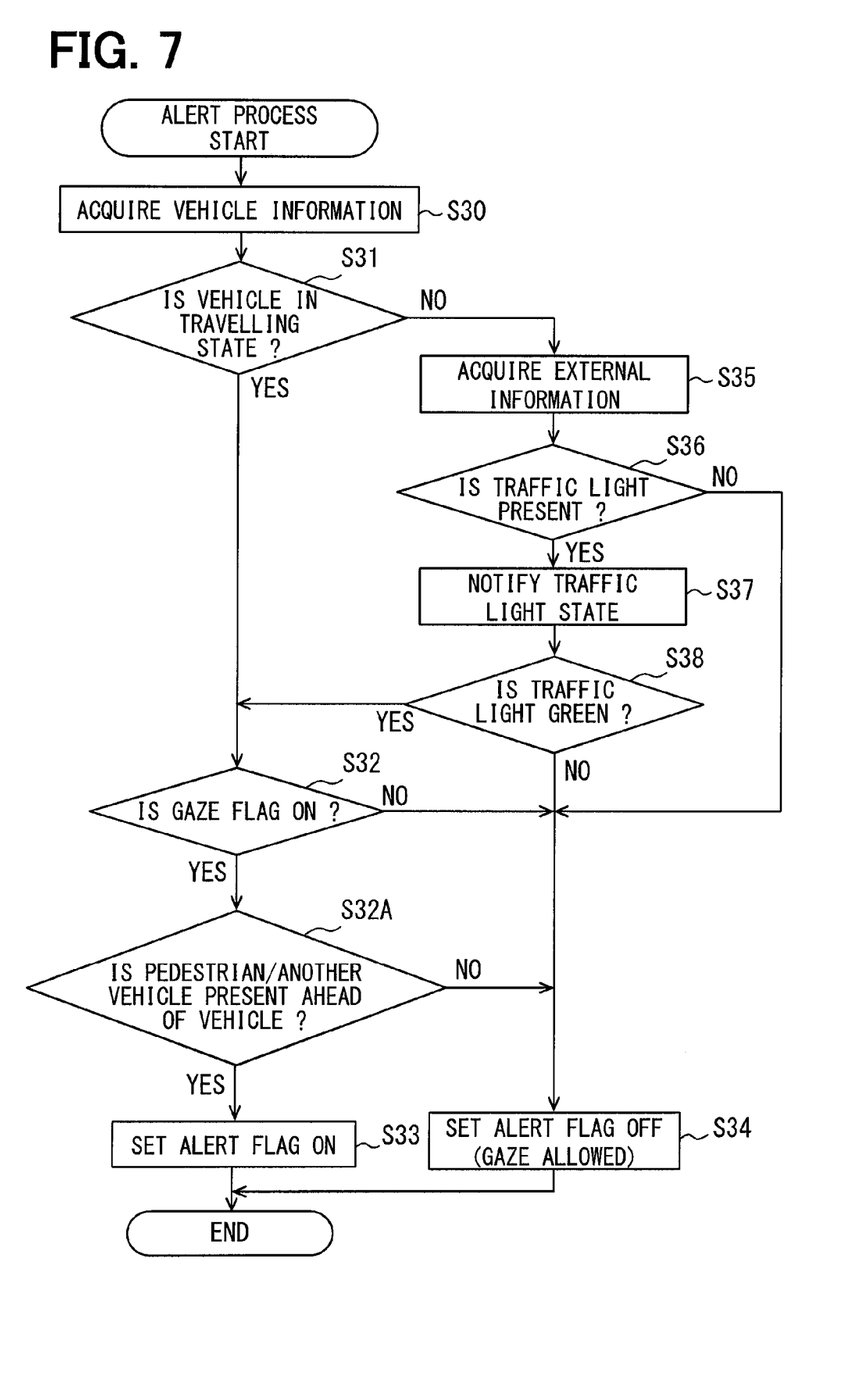
FIG. 7 is a flowchart showing an alert process according to a second embodiment of the present disclosure.

In the present embodiment, process in step S32A (circumstance determination portion) shown in FIG. 7 is added to the process described with reference to FIG. 6 in the first embodiment above. The process in step S32A is performed when the CPU 31 determines in step S32 that a gaze flag is set to ON. In step S32A, whether a pedestrian or another vehicle (vehicle 3) is present ahead of the vehicle 10 is determined. For example, when an obstacle is detected within a predetermined region ahead of the vehicle 10 by an obstacle sensor 13 or an external camera 12 shown in FIG. 2, the CPU 31 determines positively that the vehicle 3 or the like is present ahead of the vehicle 10 in step S32A.

When a positive determination is made in step S32A, an alert flag is set to ON in subsequent step S33. On the other hand, when a negative determination is made in step S32A, the alert flag is set to OFF in subsequent step S34 and the current circumstance is estimated to be a gaze allowed circumstance.

Hence, in a case where the vehicle 10 is halted in spite of a green light, the alert flag is set to OFF and a driver is allowed to look at a mobile terminal 30 when neither another vehicle nor a pedestrian is present ahead of the vehicle 10 regardless of whether the gaze flag is set to ON. Also, even in a case where the gaze flag is ON while the vehicle 10 is travelling, the alert flag is set to OFF and the driver is allowed to look at the mobile terminal 30 when neither another vehicle nor a pedestrian is present ahead of the vehicle 10.

By performing the process in FIG. 7, for example, in a case where the driver who was looking at a display unit 32 when the vehicle 10 was halted at a red light is still looking at the display unit 32 after the traffic light turned to green, the driver is alerted when another vehicle or the like is present ahead of the vehicle 10. On the other hand, even when the driver is still looking at the display unit 32, the driver is not alerted when neither another vehicle nor a pedestrian is present ahead of the vehicle 10 since this circumstance is estimated as the gaze allowed circumstance.

A process performed by the CPU 31 in steps S31, S32, S36, S38, and S32A corresponds to "a circumstance determination portion", and the circumstance determination portion determines whether the current circumstance is the gaze allowed circumstance where the driver is allowed to look at the display unit 32.

According to the present embodiment as above, the circumstance determination portion determines that the current circumstance is the gaze allowed circumstance in a case where the vehicle 10 is halted when a light on a traffic light 2 at an intersection 1 is green on the condition that neither another vehicle nor a pedestrian is present ahead of the vehicle 10. Hence, alerting the driver more than necessary even when neither another vehicle nor a pedestrian is present ahead of the vehicle 10 is restricted. Accordingly, making the driver feel annoyed by excessively alerting the driver can be avoided. In a case where another vehicle or a pedestrian is present ahead of the vehicle 10, the driver who is still looking at the mobile terminal 30 in spite of a green light is alerted.

Third Embodiment

Figure 8:
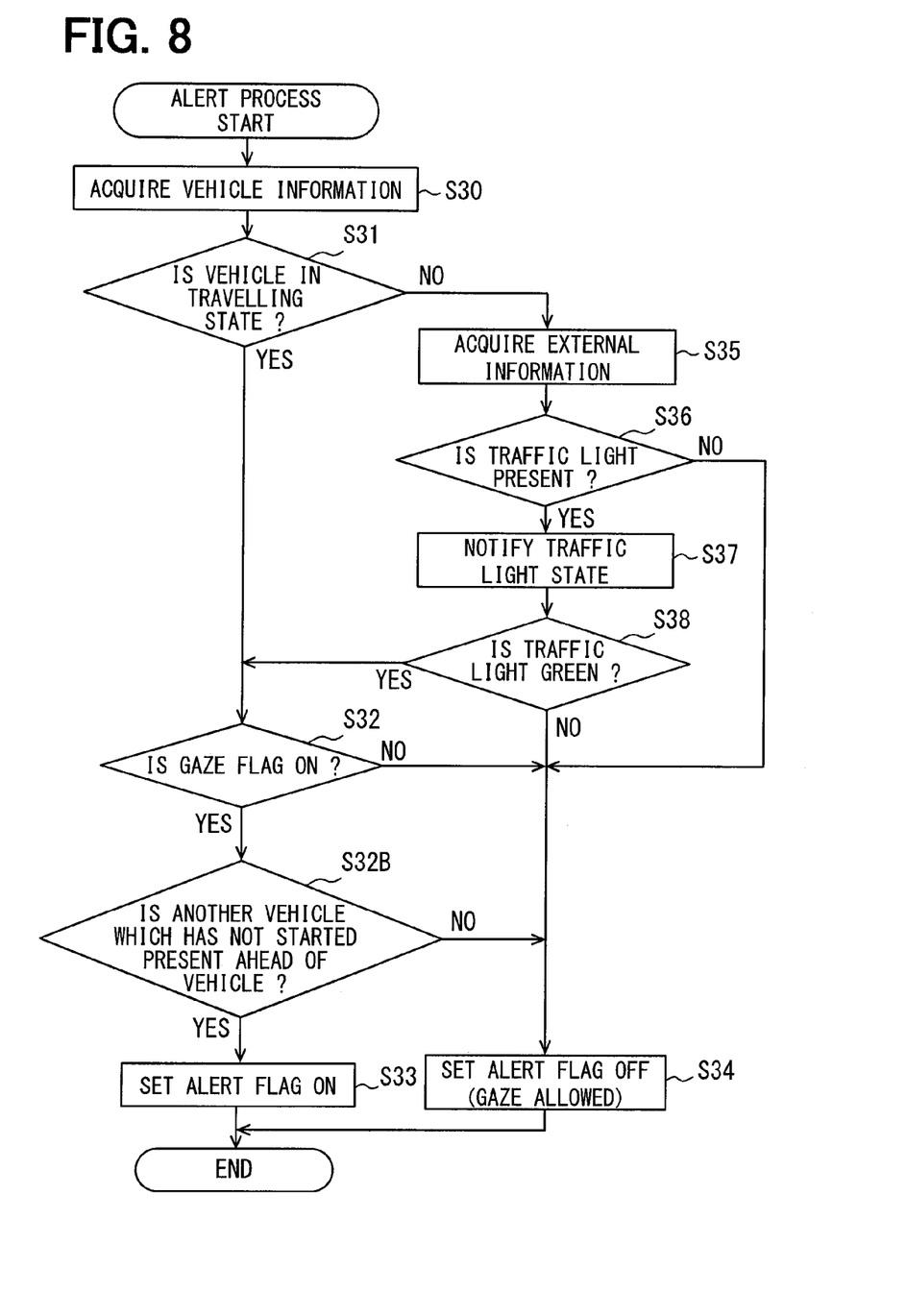
FIG. 8 is a flowchart showing an alert process according to a third embodiment of the present disclosure.

In the present embodiment, the step S32A of the second embodiment above is changed to step S32B (circumstance determination portion) as shown in FIG. 8. The process in step S32B is performed when the CPU 31 determines in step S32 that a gaze flag is set to ON. In step S32B, the CPU 31 determines whether a halted vehicle 3 is present ahead of a vehicle 10. For example, when the vehicle 3 ahead of the vehicle 10 is detected by an obstacle sensor 13 or an external camera 12 shown in FIG. 2 and a detected location of the vehicle 3 ahead of the vehicle 10 does not vary at all, the CPU 31 determines that a halted vehicle 3 is present ahead of the vehicle 10.

When a positive determination is made in step S32B, an alert flag is set to ON in subsequent step S33. On the other hand, when a negative determination is made in step S32B, the alert flag is set to OFF in subsequent step S34 since the current circumstance is estimated to be gaze allowed circumstance.

Hence, in a case where the vehicle 10 is halted in spite of a green light, the alert flag is set to OFF and a driver is allowed to look at a display unit 32 when no vehicle 3 that has not started yet is present ahead of the vehicle 10 even though the gaze flag is set to ON. Also, even in a case where the gaze flag is set to ON while the vehicle 10 is travelling, the alert flag is set to OFF and the driver is allowed to look at the display unit 32 when no halted vehicle 3 is present ahead of the vehicle 10.

By performing the process in FIG. 8, for example, in a case where the driver who was looking at the display unit 32 when the vehicle 10 was halted at a red light is still looking at the display unit 32 after the traffic light turned to green, the driver is alerted when the vehicle 3 is present ahead of the vehicle 10. On the other hand, even when the driver is still looking at the display unit 32, the driver is not alerted when the vehicle 3 is not present ahead of the vehicle 10 because the current circumstance is estimated to be the gaze allowed circumstance.

A process performed by the CPU 31 in steps S31, S32, S36, S38, and S32B corresponds to "a circumstance determination portion", and the circumstance determination portion determines whether the current circumstance is the gaze allowed circumstance where the driver is allowed to look at the display unit 32.

According to the present embodiment as above, in a case where the vehicle 10 is halted when a light on a traffic light 2 at an intersection 1 is green, a determination is made that it is the gaze allowed circumstance on the condition that no vehicle (vehicle 3) which has not started yet is present ahead of the vehicle 10. Hence, alerting the driver more than necessary even when no vehicle 3 which has not started yet is present ahead of the vehicle 10 can be restricted. Accordingly, making the driver feel annoyed by excessively alerting the driver can be avoided. Nevertheless, the driver who is looking at the mobile terminal 30 in spite of a green light can be alerted in a case where the vehicle 3 which is not started yet is present ahead of the vehicle 10.

Fourth Embodiment

Figure 9:
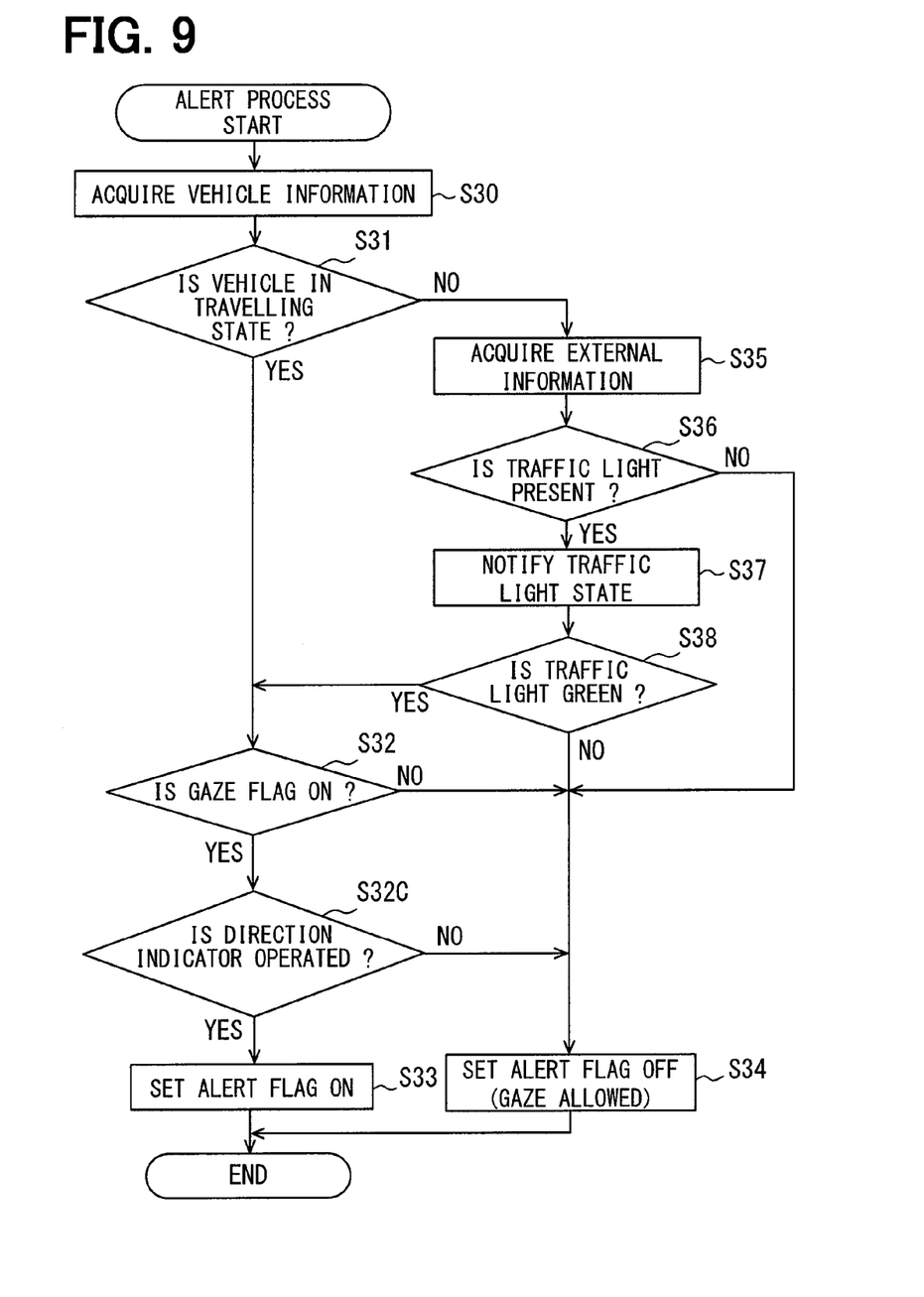
FIG. 9 is a flowchart showing an alert process according to a fourth embodiment of the present disclosure.

In the present embodiment, the process in step S32A of the second embodiment above is changed to process in step S32C (circumstance determination portion) shown in FIG. 9. The process in step S32C is performed when the gaze flag is determined to be ON in step S32. In step S32C, the CPU 31 determines whether a direction indicator provided to the vehicle 10 is in operating state by the driver.

When the CPU 31 determines positively in step S32C that the direction indicator is in operating state, an alert flag is set to ON in subsequent step S33. On the other hand, when a negative determination is made in step S32C, the alert flag is set to OFF in subsequent step S34 because the current circumstance is estimated to be the gaze allowed circumstance.

Hence, in a case where the vehicle 10 is halted in spite of a green light, the alert flag is set to OFF and the driver is allowed to look at the display unit 32 when the direction indicator is not in operating state even though the gaze flag is set to ON. Also, even in a case where the gaze flag is set to ON while the vehicle 10 is travelling, the alert flag is set to OFF and the driver is allowed to look at the display unit 32 when the direction indicator is not in operating state.

By performing the process in FIG. 9, for example, in a case where the direction indicator is in operating state when the vehicle 10 is halted at an intersection 1 under a green light, the driver is alerted when the driver is looking at the display unit 32 because it is assumed that the vehicle 10 is going to take a right or left turn. In a case where the direction indicator is in operating state while the vehicle 10 is travelling, the driver is also alerted when the driver is looking at the display unit 32 because it is assumed that the vehicle 10 is going to switch lanes or taking right or left turn. On the other hand, even when the driver is looking at the display unit 32, the driver is not alerted unless the direction indicator is in operating state because the current circumstance is estimated to be the gaze allowed circumstance.

A process performed by the CPU 31 in steps S31, S32, S36, S38, and S32C corresponds to "a circumstance determination portion", and the circumstance determination portion determines whether the current circumstance is the gaze allowed circumstance where the driver is allowed to look at the display unit 32. An allowed action to look at the display unit 32 herein is referred to also as allowed gazing.

According to the present embodiment as above, in a case where the vehicle 10 is halted when the traffic light 2 at the intersection 1 is green, a determination is made that the current circumstance is the gaze allowed circumstance on the condition that the direction indicator of the vehicle 10 is not in operating state. Hence, alerting the driver more than necessary even when the vehicle 10 is not supposed to take a right or left turn can be restricted. Accordingly, making the driver feel annoyed by excessively alerting the driver can be avoided. Nevertheless, the driver who is looking at the mobile terminal 30 in spite of a green light can be alerted when the vehicle 10 is supposed to take a right or left turn, that is, the direction indicator is in operating state.

Fifth Embodiment

Figure 10:
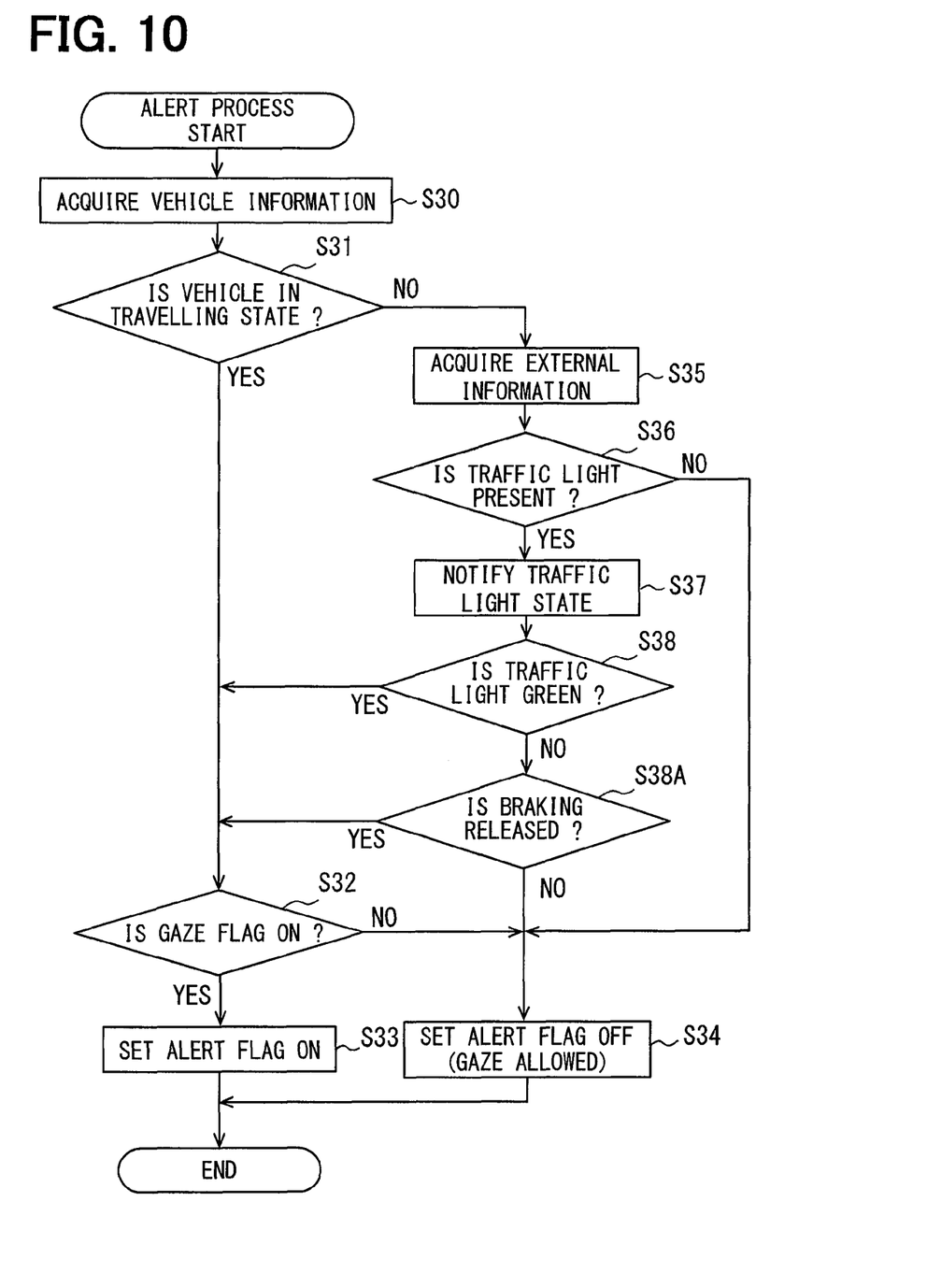
FIG. 10 is a flowchart showing an alert process according to a fifth embodiment of the present disclosure.

In the present embodiment, process in step S38A (circumstance determination portion) shown in FIG. 10 is added to the process described with reference to FIG. 6 in the first embodiment above. The process in step S38A is performed when the CPU 31 determines negatively in step S38 that the traffic light is not green. In step S38A, the CPU 31 determines whether braking is released due to insufficient depression on a brake pedal of a vehicle 10.

When the CPU 31 determines positively in step S38A that the braking is released, the process proceeds to step S32. When the CPU 31 determines negatively in step S38A that the braking is not released, the process proceeds to step S34 in which an alert flag is set to OFF. When determining in step S32 that a gaze flag is set to ON, the CPU 31 sets the alert flag to ON in subsequent step S33. Hence, the alert flag is set to ON when the gaze flag is ON in a case where the braking is released regardless of whether the traffic light is red or yellow.

By performing the process in FIG. 10, for example, in a case where the driver is looking at a display unit 32 when the vehicle 10 is halted at an intersection 1 at a red or yellow light, the driver is alerted when a depression force on the brake pedal becomes insufficient against an intention of the driver.

A process performed by the CPU 31 in steps S31, S32, S36, S38, and S38A corresponds to "a circumstance determination portion", and the circumstance determination portion determines whether the current circumstance is the gaze allowed circumstance where the driver is allowed to look at the display unit 32.

According to the present embodiment as above, in a case where the vehicle 10 is halted when a light on a traffic light 2 at the intersection 1 is red, a determination is made that the current circumstance is the gaze allowed circumstance on the condition that the braking pedal of the vehicle 10 is sufficiently depressed. Hence, even in a case where the driver is looking at the mobile terminal 30 at a red light, the driver who is looking at the mobile terminal 30 can be alerted when a depression force on the brake pedal becomes insufficient.

Sixth Embodiment

Figure 11:
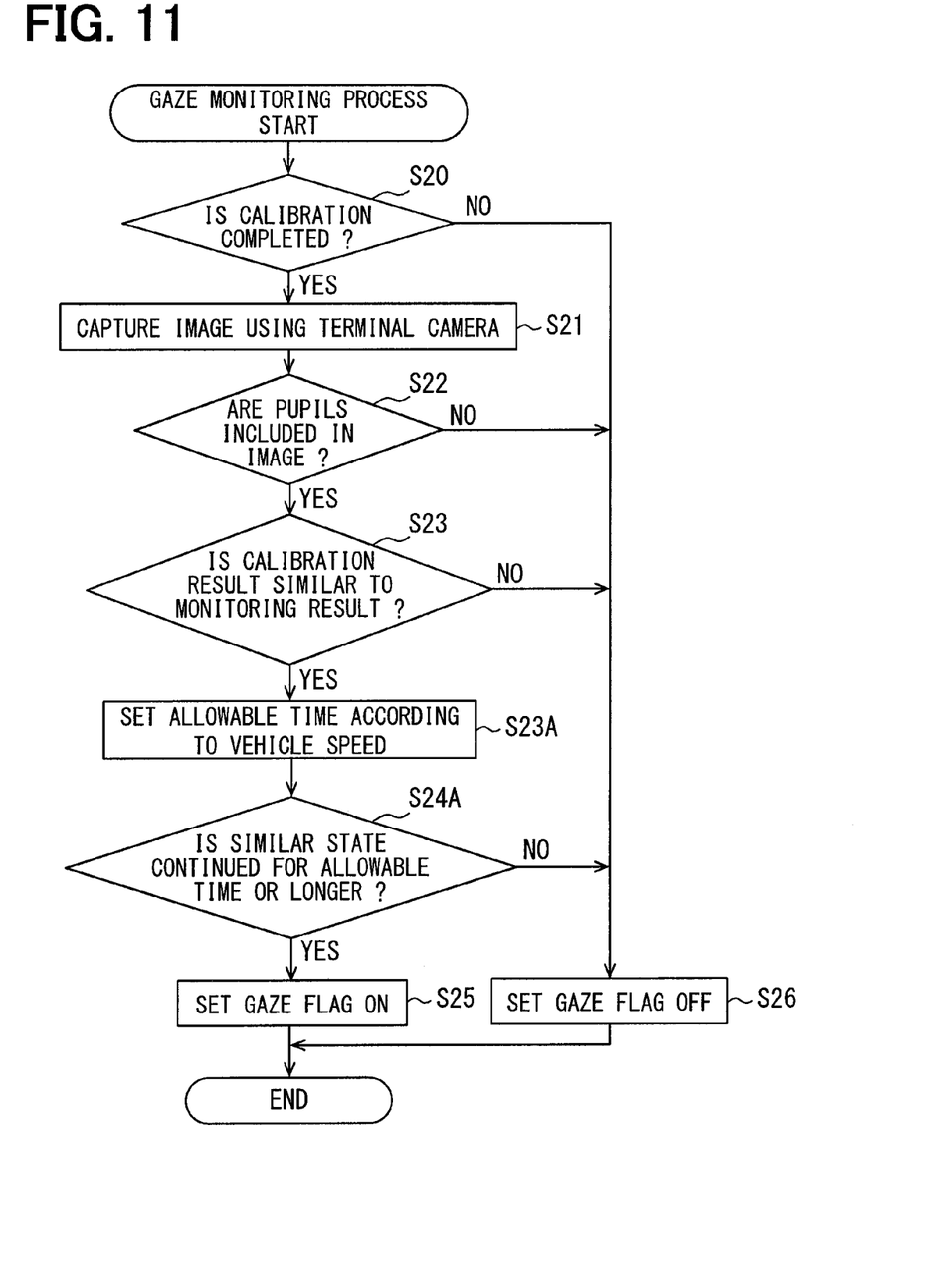
FIG. 11 is a flowchart showing a gaze monitoring process according to a sixth embodiment of the present disclosure.

In the present embodiment, the process in step S24 in the first embodiment above is changed to process in steps S23A and S24A (gaze determination portion) shown in FIG. 11. The process in steps S23A and S24A is performed when the CPU 31 determines positively in step S23 that a calibration result and a monitoring result are similar to each other. In step S23A, a value of an allowable time used for a determination in following step S24A is set according to a travel speed (vehicle speed) of a vehicle 10. The allowable time is set shorter with an increase of the vehicle speed. In subsequent step S24A, the CPU 31 determines whether a state in which the results are similar to each other has continued for the allowable time set in step S23A or longer.

When the CPU 31 determines positively in step S24A that the state has continued for the allowable time or longer, a gaze flag is set to ON in subsequent step S25. On the other hand, when a negative determination is made in step S24A, the gaze flag is set to OFF. A process performed by the CPU 31 in steps S23A and S24A corresponds to "a gaze determination portion", and the gaze determination portion determines whether a driver is looking at a display unit 32.

According to the present embodiment as above, a determination reference (allowable time) on the basis of which to determine whether the driver is looking at the display unit 32 is changed according to a travel speed of the vehicle 10. More specifically, the allowable time used for a gaze determination while the vehicle 10 is travelling at a high speed is set shorter than the allowable time used for a gaze determination while the vehicle 10 is travelling at a low speed. That is, the allowable time used for a gaze determination is set to be shorter with an increase of the travelling speed of the vehicle. A travelling distance while the driver is looking at the display unit 32 becomes longer as the vehicle 10 travels at a higher speed. Hence, it is preferable to set a time to allow the driver to look at the display unit 32 shorter as the vehicle 10 travels at a higher speed.

It is noted that a flowchart or the processing of the flowchart in the present disclosure includes portions (also referred to as steps), each of which is represented, for instance, as S10. Further, each portion can be divided into several sub-portions while several portions can be combined into a single portion. Furthermore, each of thus configured portions can be also referred to as a circuit, device, module, or means.

Each or any combination of portions explained in the above can be achieved as (i) a software portion in combination with a hardware unit (e.g., computer) or (ii) a hardware portion, including or not including a function of a related apparatus; furthermore, the hardware portion (e.g., integrated circuit, hard-wired logic circuit) may be constructed inside of a microcomputer.

Other Embodiments

The above has described the preferred embodiments of the present disclosure. It should be appreciated, however, that the present disclosure is not limited to the embodiments above and can be modified in various manners, and example of modifications will be described below. Besides portions of the respective embodiments combined as explicitly described above, the embodiments can be combined partially even when such a combination has not been described explicitly unless a trouble arises from the combination.

The CPU 31 of the mobile terminal 30 or the CPU 21 of the vehicle-mounted device 20 may compute a direction in which the driver should direct a visual line on the basis of the external information and compute an amount of deviation between the direction in which the visual line should be directed and an actual direction of the visual line to the mobile terminal 30. As a computed amount of deviation becomes larger, a degree of alert may be increased by, for example, increasing an output volume of the speaker 33. Specific examples of the direction in which the visual line should be directed include the traffic light 2, the intersection 1, a vehicle running ahead of the vehicle 10 and the like.

The present disclosure is not limited to a case where the process in FIG. 5 and FIG. 6 is performed by the CPU 31 of the mobile terminal 30. At least a part of the process in FIG. 5 and FIG. 6 may be performed by the CPU 21 of the vehicle-mounted device 20. In such a case, the alerting device is presented by the mobile terminal 30 and the vehicle-mounted device 20 together or by the vehicle-mounted device 20 alone.

In the foregoing embodiments, in a case where a signal of the alert command is outputted because the alert flag is ON, the driver is alerted by actuating the display unit 32, the speaker 33, and the vibration motor 34 of the mobile terminal 30. However, the driver may be alerted instead by actuating the speaker 23 and the display unit 22 provided to the vehicle 10.

In the foregoing second, third, and fourth embodiments of the present disclosure, the driver is not alerted when a negative determination is made in step S32A, S32B, or S32C even when the CPU 31 determines in step S31 that the vehicle 10 is travelling and it is also determined in step S32 that the gaze flag is set to ON. On the contrary, the driver may be alerted whenever the gaze flag is set to ON while the vehicle 10 is travelling regardless of a determination result of step S32A, S32B, or S32C.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. An alerting device which alerts a driver of a vehicle when the driver is looking at a display unit of a mobile terminal equipped with a camera, the alerting device comprising:
  a gaze determination portion determining whether the driver is looking at the display unit of the mobile terminal based on image data of an image captured by the camera equipped to the mobile terminal;
  an alert command portion outputting a command to alert the driver when the gaze determination portion determines that the driver is looking at the display unit of the mobile terminal; and
  a circumstance determination portion determining whether a current circumstance is a gaze allowed circumstance, wherein
  the gaze allowed circumstance is a circumstance in which the driver is allowed to look at the display unit of the mobile terminal,
  the alert command portion outputs the command when the circumstance determination portion determines that the current circumstance is not the gaze allowed circumstance, and
  the circumstance determination portion determines that the current circumstance is the gaze allowed circumstance when the vehicle is halted at an intersection by a traffic light which indicates red.

2. The alerting device according to claim 1, wherein the circumstance determination portion determines that the current circumstance is not the gaze allowed circumstance while the vehicle is travelling.

3. The alerting device according to claim 1, wherein the circumstance determination portion determines that the current circumstance is not the gaze allowed circumstance when the vehicle is still in a halt state at an intersection even though a traffic light at the intersection indicates green.

4. The alerting device according to claim 1, wherein, under a condition that neither another vehicle nor a pedestrian is present ahead of the vehicle, the circumference determination portion determines that the current circumstance is the gaze allowed circumstance when the vehicle is still in a halt state at an intersection even though a traffic light at the intersection indicates green.

5. The alerting device according to claim 1, wherein, under a condition that another vehicle which has not started yet does not exist ahead of the vehicle, the circumstance determination portion determines that the current circumstance is the gaze allowed circumstance when the vehicle is still in a halt state at an intersection even though a traffic light at the intersection indicates green.

6. The alerting device according to claim 1, wherein, under a condition that a direction indicator of the vehicle is not in operated state, the circumstance determination portion determines that the current circumstance is the gaze allowed circumstance when the vehicle is still in a halt state at an intersection even though a traffic light at an intersection indicates green.

7. The alerting device according to claim 1, wherein, under a condition that a brake pedal of the vehicle is in operated state, the circumstance determination portion determines that the current circumstance is the gaze allowed circumstance when the vehicle is halted at an intersection by a traffic light which indicates red.

8. The alerting device according to claim 1, wherein the gaze determination portion changes a determination reference according to a travel speed of the vehicle.

9. The alerting device according to claim 1, further comprising:
  a notification command portion outputting a command to notify the driver of a state of a traffic light when the vehicle is halted at an intersection where the traffic light is installed.

10. The alerting device according to claim 9, wherein the display unit of the mobile terminal displays an image in a color corresponding to a color of the traffic light according to the command outputted from the notification command portion.

11. The alerting device according to claim 1, further comprising:
  a calibration portion acquiring the image data of the image captured by the camera equipped to the mobile terminal when the driver is looking at the display unit of the mobile terminal,
  wherein the gaze determination portion determines whether the driver is looking at the display unit of the mobile terminal with reference to the image data acquired by the calibration portion.

* * * * *